United States Patent [15] 3,689,702

McCay [45] Sept. 5, 1972

[54] REMOTE DIALING TELEPHONE APPARATUS

[72] Inventor: Thomas E. McCay, Norman, Okla.

[73] Assignee: Com-U-Trol Corp., Chicago, Ill.

[22] Filed: July 9, 1970

[21] Appl. No.: 53,498

[52] U.S. Cl. ....................179/18 BE

[51] Int. Cl. ....................H04m 3/54

[58] Field of Search .......179/41 A, 18 BE, 2 A, 2 DP

[56] References Cited

UNITED STATES PATENTS 3,443,035 5/1969 McCay ....................179/41 A

*Primary Examiner*—William C. Cooper
*Attorney*—Silverman & Cass

[57] ABSTRACT

A call initiated from any remote and random location to an input line of a central station is made capable of seizing an output line from the central station; whereby, a caller at the remote location can thereupon call any desired location as if the call had originated from the central station. The central station operates automatically and is provided with: a plural function tone detector and decoder which regulates line seizure and control functions, a trip ring circuit and a trip ring control circuit. The originating caller is provided with a portable tone generating encoder, which is employed for line seizure, control functions, and dialing of the desired location.

19 Claims, 2 Drawing Figures

INVENTOR
THOMAS E. McCAY
BY Silverman & Cass
ATTYS.

INVENTOR
THOMAS E. McCAY
BY Silverman & Cass
ATTYS

REMOTE DIALING TELEPHONE APPARATUS

BACKGROUND OF THE INVENTION

This invention generally deals with remote control techniques for telephone usage and, more particularly, with the seizure, control over, and utilization of a second telephone circuit by use of any remote telephone, so that a caller can employ a first or incoming telephone circuit in a central station for completely dialing any desired location, as if the caller was originating the call from the second, or outgoing telephone circuit in the central station.

The ever increasing need for speedy communications over long and short distances has placed telephone communications in prominance as an essential arm of successful business operations. The ordering of merchandise, customer contacts, business conferences, reports and requests from outside salesmen are but a few of the facets of current business practices now being carried out by telephone communications.

Special business needs have spawned special telephone services and equipment, such as: secretarial type answering services, recorded answering equipment, conference call facilities, direct line and tie line connections, WATS (Wide Area Telephone Service), automatic dialing devices, and call rerouters, to name a few.

The last mentioned automatic dialing devices and call rerouters provide specialized remote control to the extent that a preprogrammed, desired location can be automatically called. The rerouter has the added attribute that it can be made operative from any remote caller location. It has the disadvantage of being able to forward or route the incoming call to only a predetermined site, over which the caller has no control. It has the further disadvantage of being nondiscriminatory; i.e., any caller automatically will be rerouted to the output location.

WATS lines, when available to a caller, can significantly reduce the cost of long distance telephone service. However, the caller must be at a WATS terminal, typically in his place of business, or on an extension line to his place of business. Thus, a caller cannot use his business' WATS line from any random and remote site, with the possible exception of circumstances by which a human telephone operator at the WATS line business terminal can perform some switchboard interconnections after she seizes the WATS line and dials the remote location.

SUMMARY OF THE INVENTION

It is a primary object of the invention to overcome the deficiencies in the prior art and provide a remote dialing telephone apparatus by which a caller at any remote site can call automatically any desired location by way of first and second telephone circuits, i.e., incoming and outgoing lines in a central station, such as his primary business office, as if the call had originated in the central station.

Another object of the invention is to provide automatic remote dialing seizure of a WATS line.

A further object of the invention is to limit line seizure access to an authorized caller, who thereupon can place a plurality of calls and has control of outgoing line release, to the exclusion of line control by the called party.

The above and other objects of the invention are accomplished by a portable control function and dialing encoder used by the caller at the remote site in conjunction with the first and second telephone circuits at the central station, and a control function decoder and control arrangement for intercoupling the first and second telephone circuit at the central station. Once the caller dials the central station by conventional dialing via the first telephone circuit, a trip ring circuit in the central station is enabled if the second telephone circuit, such as a WATS line, is available. Under such condition, incoming ringing on the first line is stopped and the caller then employs his control function encoder, preferably a tone signal encoder, to seize the second telephone circuit, by way of the control function decoder. Thereupon the caller employs his encoder to dial the desired location. Upon completion of the call, the caller has the option of using his encoder to release the second circuit only to the extent that he can dial another desired location i.e., a momentary release, or for total release of both lines.

DESCRIPTION OF THE PREFERRED EMBODIMENT

Figure 1:
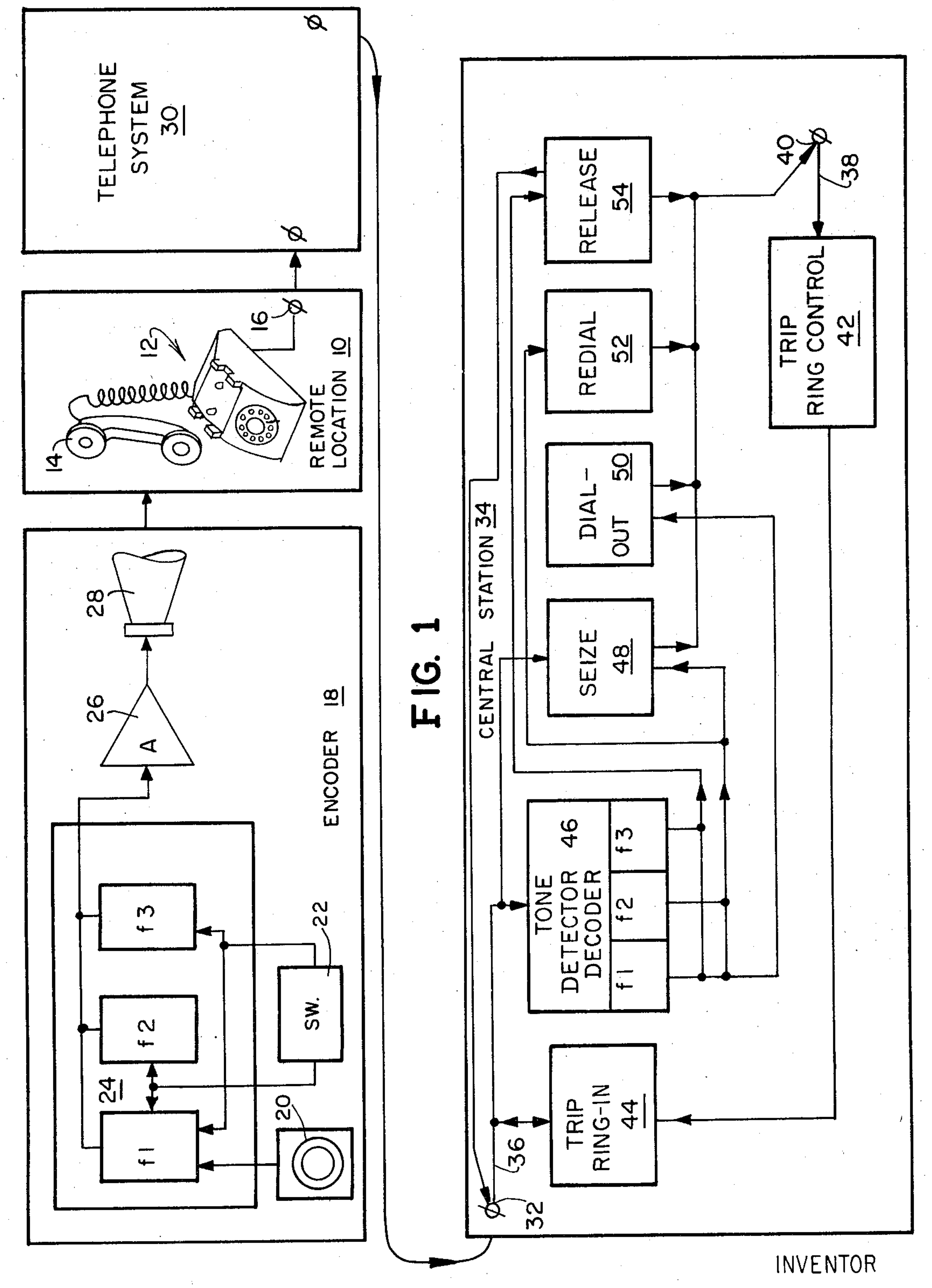
FIG. 1 is a block diagram including the subject apparatus.

With reference to FIG. 1, a remote location 10 is defined as any place having any conventional form of telephone unit 12 which operates by dial or touch-tone, has an audio input portion 14 and a signal output terminal 16.

An authorized user of the subject apparatus, who will be identified as the caller, is provided with a portable encoder 18, which comprises a dialing mechanism 20, a switch 22, a three tone generator 24, a power amplifier 26, and an audio transducer 28. The encoder 18 is powered by battery means not shown and this entire unit would be compact enough to be carried easily by the caller and manipulated by him.

The tone generator 24 may comprise three multivibrators *f1*, *f2* and *f3* which oscillate to produce tones at those three frequencies, respectively. The outputs from the three multivibrators are mixed in the input circuit of the power amplifier 26, which may be of the Darlington type.

The dialing mechanism 20 is a normally closed switch. Dialing action produces a series of brief open circuit signal generating conditions, the number of which depend upon the dialed digit value. As shown, the dialing mechanism 20 is directly connected to the tone generator; hence, dialing will produce digit valued bursts of signals of tone *f*1, which are coupled to the power amplifier 26 and then are applied to the transducer 28, which is to be positioned adjacent the audio input portion 14 of the telephone unit 12, and thus to the output terminal 16.

In one position of the switch 22, the generators *f1* and *f2* are energized to produce an output at the output terminal 16. In another position of the switch 22, the generators *f1* and *f3* are energized to produce their tone outputs for the output terminal 16. As employed hereinafter tones $f1$ plus $f2$ will be employed to seize and subsequently redial the outgoing line from the central station. The combination of tones $f1$ and $f3$ will be employed to clear the system, i.e., simultaneously release both the incoming and outgoing lines in the central station.

For security purposes, the tone frequencies and/or code format can be changed from time to time. Tone transmission encoding and decoding is preferably employed, since these A.C. signals can be transmitted more reliably than D.C. signals; however, the herein disclosed use of tone does not exclude the use of D.C. signal code use.

The already existing, standard, commercial telephone system 30 couples the output terminal 16 at the remote location 10 to an input terminal 32 of the central station 34. As previously discussed, the central station could be the caller's business office, having a plurality of telephone lines, at least one of which is an incoming line or first circuit line 36, and another of which is an outgoing or second circuit line 38, such as a WATS line, provided with a terminal 40. It is important to recall that the central station can be automatic and no human operator thereat is necessary for the control of the subject apparatus of this invention.

A trip ring control circuit 42 in the central station is responsive to the condition of the outgoing line 38. If the outgoing line is not in use, the control circuit 42 supplies an available signal to a trip ring-in circuit 44 which is connected to the incoming first line 36. As a result, the incoming ringing is stopped during the first ring, and this absence of ringing advises the remote caller that the outgoing line is available for seizure. Decoding means in the form of a detector 46, having detecting sections $f1$, $f2$ and $f3$ which are sensitive to the corresponding tone generators in the encoder 18, is also provided, so that after the caller dials the incoming line 36 by the remote telephone unit 12 and he receives the outgoing line availability signal, he then transmits a second line seize signal from his encoder 18 to the central station. As above mentioned, the line seize signal employs the combination of tones $f1$ plus $f2$. If the outgoing second line 38 had been busy, the trip ring control circuit 42 would not have enabled the trip ring-in circuit 44, and ringing would have continued on the input line to signify that the output line was busy, and the $f1$ and $f2$ sections of the tone detector 46 would not have been permitted to respond to the line seizure signal. In such case the ring-in signal continues and is equivalent to a busy signal. However, if the outgoing line 38 is available, the above described elements 42, 44, and 46 respond to apply a seizure signal to a seize circuit 48 that couples the incoming line 36 to the outgoing line 38 and returns dial tone from the outgoing line 38 to the incoming line 36 and to the remote telephone unit 12.

Thereupon, the caller employs the dialing mechanism 20 of his encoder 24 to transmit bursts of tone $f1$ from the encoder, through the remote unit 12, to input line 36, through the detector 46, to a dial-out circuit 50, which converts the bursts of tone to pulses that are applied, to the output line 38, which responds as if it were being dialed from the central station. Once this is accomplished, the remote unit 12 is conventionally used by the caller to converse with the desired location.

Upon completion of his conversation, the caller possesses a choice of releasing his control over both of the lines 36 and 38 or to momentarily release only the outgoing line 38 to regain dial tone and again dial out to any other desired location. The redialing function is enabled by transmission of the tones $f1$ plus $f2$ from the encoder through the tone detector to a redial circuit 52 in the central station. The total release function is accomplished by moving the encoder switch to its $f1$ plus f3 tone code position and applying that tone code to a release circuit 54 in the central station.

Figure 2:
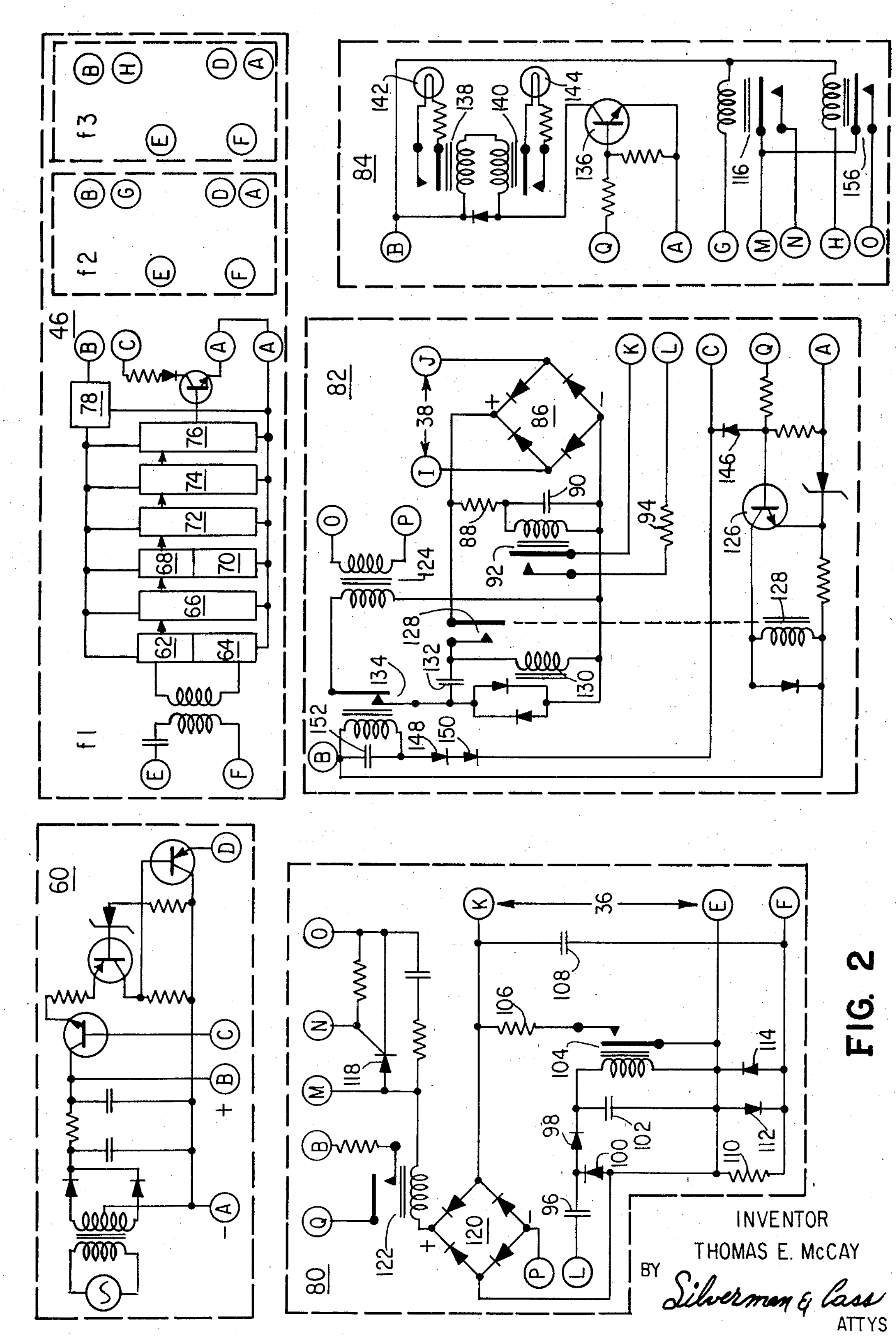
FIG. 2 is a schematic drawing of the major elements of the subject apparatus in the central station.

The invention as above disclosed with reference to FIG. 1 is capable of being executed electronically in any one of several modes by use of a variety of different circuit elements and subcircuits. Considerations of cost, space and ease of maintainance also would affect any commercial forms of the invention. FIG. 2 illustrates a commercial form of the central station contents of the invention, which, though it may appear more complex than necessary, is actually an especially efficient unit to the extent several elements serve more than one purpose; i.e., several elements would be logically placed in more than one of the building blocks of FIG. 1. Because of this work sharing, wired interconnections if shown on FIG. 2, might be confusing; hence, lead lines have been cut and arbitrary terminals inserted for ease of description. Such terminals carry alphabetic identification, and several terminals can and do carry the same identification, thus designating that they are coupled to one another, so as to be electrically the same.

Looking at FIG. 2, a power supply 60 is provided and has a negative terminal A, a positive terminal B, and control terminals C and D, the connections and purposes for which will become apparent as this description unfolds. The internal contents and operation of the power supply are substantially conventional and will not be developed further.

The tone detector 46 is illustrated with its detecting portion $f1$ in schematic form and the logically corresponding portions $f2$ and $f3$ in block form. As those skilled in the art know, tone receivers, detectors and decoders of the general type useful in the invention are on-the-shelf items. For sake of completeness of disclosure, the schematic of the detector portion $f1$ is substantially that as marketed by Trepac Corporation of America as its Tone Receiver model R–800; however, the invention is not limited to the use of this tone receiver.

As shown, the tone detector has a pair of input terminals E and F which are transformer coupled to the following plurality of connected elements: an AF amplifier 62, an input filter 64, a limiter 66, a filter 68, an AF amplifier 70, a frequency to D.C. converter 72, a D.C. amplifier 74, a level and band width control 76, and a voltage regulator 78. Such combination of elements or its general equivalent is responsive to code signals of the frequency $f1$ from the $f1$ generator in the encoder 18 and produces across its terminals B and C an active output or decoded signal whenever there is an input signal of frequency $f1$. In like manner, the tone detectors $f2$ and $f3$ respond, respectively, to input code signals of frequencies $f2$ and $f3$ to produce active output signals at their terminals B, G and B, H, respectively.

For ease of presenting the next following description, the remaining circuitry in the central station is subdivided into three circuit portions, as if they were on printed circuit boards: an input circuit portion 80, which contains the incoming call line 36 discussed with reference to FIG. 1; and output circuit portion 82, which includes the outgoing line 38 introduced with reference to FIG. 1; and a relay circuit portion 84.

Assuming that the outgoing line 38 is available, i.e., is not busy with another call, its terminals I and J in the circuit 82 will be high with respect to voltage. Such voltage is polarized by a rectifier bridge 86 and is applied by a resistor 88 to the parallel combination of a capacitor 90 and the coil of a normally open relay 92, to close its contacts. The resistor 88 acts to limit the current from the line 38 so that the central station 34 "-sees" the line 38 as being "on-hook", hence available. The just introduced components effectively comprise the trip ring control circuit 42.

The incoming line 36 appears at the terminals E and K of the input circuit 80 and the incoming ringing from the caller at the remote location 10 is received at the terminals E and K and is voltage coupled to the terminal K in the output circuit 82. Since the contacts of the relay 92 are closed, because of the trip ring control status, the voltage at the terminal K of the output circuit 82 is applied to a resistor 94 and then to an output circuit terminal L, which is coupled to an input circuit terminal L. Thereupon, the ringing signal is received by a capacitor 96 and is rectified by a pair of diodes 98 and 100, is filtered by a capacitor 102, and is applied to the coil of a normally open relay 104, causing its contacts to close. The latter action connects a load resistor 106 across the terminals E and K of the incoming line 36 and is effective in tripping the incoming ringing signal during the first ring-in, so as to stop the ringing tone as heard by the caller. As would be understood, the just above introduced components comprise the trip ring-in circuit 44.

The apparatus is now ready for seizure of the outgoing line 38. The *f1* plus *f2* encoder signals are transmitted from the encoder 18 through the telephone unit 12 to input circuit terminals E and K of the input line 36. A capacitor 108 couples the seize signal to the parallel arrangement of a resistor 110, and oppositely poled diodes 112 and 114 so that this signal is applied from the terminals E and F of the input circuit to the corresponding terminals of the detector portions *f1*, *f2* and f3 in the detector 46. Since frequency *f3* is not part of the seize code, the detector portion *f3* remains passive; however, the combination of frequencies *f1* and *f2* causes the terminal G of the detector *f2* to be grounded, thus applying ground potential to the corresponding terminal g in the relay circuit 84. Grounding of the terminal G in the circuit 84 completes a circuit path from its terminal B to its terminal G by way of the coil of a normally open relay 116, closing the contacts relay to complete a circuit path between the terminals M and N of the relay circuit 84. The latter action applies the seize signal to the corresponding terminals M and N of the input circuit 80, which are coupled to and elicit the triggering into conduction of an SCR 118.

As a result of the conduction of the SCR 118, current flows from the incoming line 36 by way of a path that includes the input circuit terminals E and K, the positive terminal of a rectifier bridge 120, the coil of a normally open relay 122, the SCR 118 and a terminal 0, which is coupled to the primary winding of a transformer 124 by way of a terminal 0, both shown on the output circuit 82, to a terminal P at the other end of the primary winding, and back to the rectifier bridge 120 at its negative terminal. Such circuit completion closes the contacts of the relay 122 and completes the path from the input circuit terminal B (power supply positive) to an adjacent terminal Q, then to the corresponding terminal Q in the output circuit 82.

As a consequence of the seize code derived energy being applied to the terminal Q, a transistor 126 in the output circuit 82 is driven into conduction and enables current to flow to the coil of a normally open relay 128 to close its contacts. The latter response causes current to flow in the output circuit 82 from the positive side of the bridge 86, through the closed contacts of the relay 128, through an inductor 130, and back to the bridge 86 at its negative side, to complete the seizing of the outgoing line 38. In this manner, dial tone from the line 38 appears across the inductor 130, is coupled by a capacitor 132 through the contacts of a normally closed relay 134, and is applied to the secondary of the transformer 124, which, by normal transformer action, applies the dial tone to the terminals O and P coupled to the transformer primary. The corresponding terminals O and P in the input circuit 80 apply the dial tone to that circuit, which carries the tone back to the input line 36 and thereupon back to the caller at the remote location. This completes the function of seizing the outgoing line 38, and the above related components coact to define the seize circuit 48 shown in FIG.2.

Also to be noted is that the closing of the contacts of the relay 122 applies conduction bias to a transistor 136 in the relay circuit 84, to thereby apply current to the respective coils of a pair of relays 138 and 140, closing their contacts so as to illuminate a pair of signal lamps 142 and 144. Such lamps thus indicate the in use status of the incoming line 36 and the outgoing line 38.

Dialing from the encoder mechanism 20, as previously disclosed, supplies bursts of tone *f1* to the incoming line 36. These dialing bursts will appear at the input circuit terminals E and K and, as above described with reference to the seize code signal, are fed out from the terminals E and F of the input circuit 80 to the corresponding terminals of the tone detector portion *f1*. Each tone burst causes the terminal C to be grounded and apply ground to the same lettered terminal C in the output circuit 82 which, by way of a diode 146, causes the transistor 126 to lose its forward bias and be turned off. Each off state of the transistor 126 causes the contacts of the relay 128 to open and thus reproduce the switching action of the dialing mechanism 20 of the encoder; hence, outpulsing on the output line 38 at its terminals I and J is accomplished.

By ground being applied to the output circuit terminal C, a complete path is present from its positive terminal B, through the coil of the normally closed relay 134 and a pair of diodes 148 and 150; thus, causing the contacts of the relay 134 to open. To prevent transient pulses due to the dialing from reaching the transformer 124, there is provided across the coil of the relay 134 a capacitor 152 having a capacitance adequate to integrate the current pulses available to the coil of the relay 134, so as to prevent the relay from following the dialing action. The above disclosure relates to the dial-out circuit 50 in FIG. 1 and at this juncture the caller is assumed to reach his party at any desired location and subsequently have completed his call.

Redialing, as it relates to the redial circuit 52 in FIG. 1, can be accomplished by opening of the contacts of the relay 128 for a short period of time to regain output line dial tone. As above described with reference to the dialing, each digit dialed signal burst of tone *f1* momentarily opens the contacts of the relay 128; hence, to reobtain dial tone and then be in the seize mode, only a reapplication of the seize code of *f1* plus *f2* from the encoder 18 is necessary. Thereafter, redialing can commence. It will be appreciated that the incoming line 36 has not been relinquished by this activity.

To fully release line control and perform the operation provided by the release circuit 54 of FIG. 1, both the incoming and outgoing lines must be disconnected. This function is accomplished by encoding the tones *f1* and *f3*, which causes the terminal H in the decoder section *f3* to be grounded and to apply ground to the corresponding terminal H in the relay circuit 84. In this manner, the relay circuit has a complete path between its terminals B and H, which includes the coil of a normally open relay 156, the contacts of the latter thus being closed to short-circuit the path between the terminals M and O of the relay circuit. Such short circuiting across the corresponding terminals M and O in the input circuit 80 switches off the SCR 118. Because of the typical SCR operation, subsequent removal of the short-circuit condition does not turn back on that element. With the SCR being nonconductive, current cannot flow in the incoming line, as earlier discussed; hence, this line is disconnected or "on-hook".

Absence of current in the incoming circuit 80 causes the contacts of the relay 122 to open and thereby open-circuit the path between the terminals Q and B in both the input and output circuits 80 and 82. As a consequence, the relay 128 is de-energized, its contacts open, and the output circuit is in the condition of the outgoing line 38 being "on-hook". The open circuiting of the terminals Q and B also removes conduction bias from the transistor 136 in the relay circuit 84, and causes the lamp relays 138 and 140 to open and thus extinguish the lamps 142 and 144, to signify that both the incoming and outgoing lines 36 and 38 in the central station 34 have been released and the subject remote dialing telephone apparatus returned to its initial state.

It is believed that the foregoing teaches those skilled in the art not only the inventive concept and the basic building blocks for attaining the goals of the invention, so that the invention can be suitably put in practice, but also teaches one preferred commercial embodiment of the invention, from which modifications can be made as may be required to suit individual needs, but still fall within the spirit and scope of the invention.

What is sought to be protected by United States Letters Patent is:

1. A remote dialing telephone apparatus for use by a caller at any remote and random telephone unit location for intercoupling an incoming line and outgoing line, both at a central station, so that the caller can call automatically any desired telephone as if the call originated at the central station, comprising:

portable encoder means for use at the remote location, said encoder means including plural function signaling means for generating code signals to be applied to the random telephone unit for transmission to the central station, said plural function signaling means including means for generating at least an outgoing line seize code signal and a release of both incoming and outgoing lines code signal, said apparatus further comprising at the central station:

means for monitoring the availability of the outgoing line and for reporting outgoing line status back to the caller by way of the central station incoming line and the random telephone unit, means for decoding the function code signals transmitted from said encoder means, outgoing line seize means interposed between said decoding means and the outgoing line and enabled by said decoding means to seize the outgoing line, if available, upon the transmission of an outgoing line seize signal from said encoder means to said decoding means, dial-out control means for converting and coupling to the outgoing line dialing type signals applied to the incoming line from the remote location, and release of lines means interposed between said decoding means and both the incoming and outgoing lines and enabled by said decoding means to release those lines upon the transmission of a line release signal from said encoder means to said decoding means.

2. Apparatus according to claim 1 in which said plural function signaling means further includes means for generating a redial enabling code signal, and redial control means, at the central station, is coupled to be responsive to the transmission of the redial enabling signal from said encoder means to said decoding means to thereupon operate with respect to the outgoing line to cause a return of outgoing line dial tone to the incoming line.

3. Apparatus according to claim 2 in which said plural function signaling means includes caller operated switching means for selecting the code signal generated by each of said means for generating code signals.

4. Apparatus according to claim 1 in which said plural function signaling means includes means for generating dialing type signals for transmission from the random unit.

5. Apparatus according to claim 4 in which said dialing type signal generating means comprises a dialing mechanism and a dial code signal generator coupled between the dialing mechanism and an output from said plural function signaling means.

6. Apparatus according to claim 5 in which said means for generating code signals in combination comprises a tone generator constructed to generate distinctive code signals incorporating at least one tone for each type of distinctive code signal.

7. Apparatus according to claim 1 in which said means for generating code signals in combination comprises a plural tone generator constructed such that the tone content of a code signal defines that signal.

8. Apparatus according to claim 7 in which said encoder means includes a transducer for applying the tone code signals to the random telephone unit.

9. Apparatus according to claim 8 in which said transducer is an audio transducer constructed to transmit through space the tone code signals to the random telephone unit.

10. Apparatus according to claim 1 in which said encoder means and said decoding means respectively contain means to send and respond to A.C. code signals.

11. Apparatus according to claim 10 in which said A.C. code means in said encoder means and decoding means are constructed to encode and decode, respectively, a plurality of tone codes, each code having a different tone content, said outgoing line seize means is responsive to a first tone code content, said dial out control means is responsive to a second tone code content, and said release of lines means is responsive to a third tone code content.

12. Apparatus according to claim 11 in which a redial control means is provided at the central station and is constructed to be responsive to said first tone code content and to operate to cause a return of outgoing line dial tone to the incoming line without release of the incoming line with respect to the random telephone unit.

13. Apparatus according to claim 1 which is constructed and arranged such that the outgoing line is a WATS line.

14. Apparatus according to claim 1 in which said outgoing line status monitoring and reporting means comprises trip ring control means coupled to said outgoing line and automatically responsive to outgoing line available and busy status for generating a corresponding signal, and trip ring-in means coupled to be responsive to the signal of said trip ring control means and also coupled to the incoming line, said trip ring-in means being constructed to stop the ringin from the remote location if the outgoing line is available, but to allow continuation of the ring-in when the outgoing line is busy.

15. Apparatus according to claim 14 in which said trip ring control means comprises rectifier means coupled to the outgoing line, impedance means coupled to said rectifier means and distinctly responsive to voltages representative of the said two different outgoing line status conditions, first switching means actuated in response to the developed voltages of said impedance means, and circuit path means coupling the outgoing line by way of said first switching means to said trip ring-in means when the outgoing line is available.

16. Apparatus according to claim 15 in which said said trip ring-in means comprises terminal means for applying the incoming ringing through said first switching means and said circuit path means, second switching means coupled to said circuit path means, responsive to the incoming ringing, and connected across the incoming line, and load means coupled to said second switching means and responsive to the incoming ringing for thereby stopping the ringing.

17. Apparatus according to claim 1 in which polarizing means are coupled to each the incoming and outgoing lines, transformer means intercouples said polarizing means, circuit paths are provided between the incoming and outgoing lines and are arranged to be completed depending upon the code signals from said encoder means, and automatic switching means, responsive to said means for decoding, completes said selective circuit paths.

18. Apparatus according to claim 1 in which said outgoing line seize means, dial-out control means, and monitoring and reporting means comprise circuitry which arbitrarily can be subdivided into input and output circuits, said input circuit comprising:

terminals for the incoming line, a first switch and a series connected load coupled across said incoming line terminals for trip ring-in purposes, a second switch responsive to the line seize code signal, a third switch, a latching switch responsive to said second switch for completing an actuating circuit path to said third switch, and first rectifying means coupled to said third switch, said first rectifying means and said latching switch being coupled to a pair of terminals leading to said output circuit;

said output circuit comprising:

terminals for the outgoing line, a fourth switch, second rectifying means coupled between said outgoing line terminals and said fourth switch, said fourth switch being responsive to the line code signal and such code signal being applied to said fourth switch by way of an electronic switch which is actuated by way of said third switch, an inductance coupled to said fourth switch and arranged to receive outgoing line dial tone, a transformer, having its primary winding coupled to said pair of input circuit terminals, and a fifth switch coupled in series between said inductance and the secondary winding of said transformer, said electronic switch also being connected to be responsive to the dialing type signals to thereupon operate the fourth switch to outpulse the outgoing line with dialing type signals.

19. Apparatus according to claim 18 in which said release of lines means comprises:

a sixth switch responsive to the release of line code signal and coupled to said latching switch for unlatching same to place the incoming line "on-hook,"

the unlatching of said latching switch causing deactuation of said third switch to thereupon operate upon said fourth switch to place the outgoing line'-'on-hook."

* * * * *